(12) United States Patent
Tange et al.

(10) Patent No.: US 7,563,337 B2
(45) Date of Patent: *Jul. 21, 2009

(54) COMPOSITE SHEET AND PROCESS FOR MAKING THE SAME

(75) Inventors: Satoru Tange, Kagawa-ken (JP); Hiroyuki Ohata, Kagawa-ken (JP)

(73) Assignee: Uni-Charm Corporation, Ehime-Ken (JP)

( * ) Notice: Subject to any disclaimer, the term of this patent is extended or adjusted under 35 U.S.C. 154(b) by 362 days.

This patent is subject to a terminal disclaimer.

(21) Appl. No.: 11/217,754

(22) Filed: Sep. 1, 2005

(65) Prior Publication Data

US 2006/0063450 A1 Mar. 23, 2006

Related U.S. Application Data

(62) Division of application No. 09/821,230, filed on Mar. 29, 2001, now Pat. No. 6,995,100.

(30) Foreign Application Priority Data

Mar. 31, 2000 (JP) ............................. 2000-099888

(51) Int. Cl.
*B32B 37/00* (2006.01)
*A61F 13/15* (2006.01)

(52) U.S. Cl. ............... 156/163; 156/164; 156/167; 156/229

(58) Field of Classification Search .......... 156/160, 156/163, 164, 229, 167
See application file for complete search history.

(56) References Cited

U.S. PATENT DOCUMENTS

| 4,209,563 | A | * | 6/1980 | Sisson | ................... | 156/167 |
| 5,116,662 | A | * | 5/1992 | Morman | ................. | 428/198 |
| 5,393,599 | A |   | 2/1995 | Quantrille et al. | | |
| 6,465,073 | B1 | * | 10/2002 | Morman et al. | .......... | 428/103 |
| 6,998,004 | B2 | * | 2/2006 | Tange et al. | ............. | 156/163 |

FOREIGN PATENT DOCUMENTS

| EP | 0 688 665 | | 12/1995 |
| EP | 0 803 602 | | 10/1997 |
| EP | 1 066 957 | | 1/2001 |
| JP | 6-184897 | | 7/1994 |
| WO | WO-92/16366 A1 | * | 10/1992 |
| WO | WO 95/19528 | | 7/1995 |

* cited by examiner

*Primary Examiner*—Jeff H Aftergut
(74) *Attorney, Agent, or Firm*—Butzel Long

(57) ABSTRACT

This invention aims to provide a composite sheet having a layer of inelastically stretchable continuous fibers improved so that a possible unevenness in fiber diameter may be minimized.

A composite sheet comprises an elastically stretchable layer and an inelastically stretchable layer formed with inelastically stretchable continuous fibers bonded to at least one surface of the elastically stretchable layer intermittently in one direction. The continuous fibers are oriented substantially in one direction thereof so that the composite sheet may present a ratio $S_1/S_2$ of 3.0 or higher where $S_1$ represents a tensile strength in this one direction and $S_2$ represents a tensile strength in the direction orthogonal to this one direction.

4 Claims, 3 Drawing Sheets

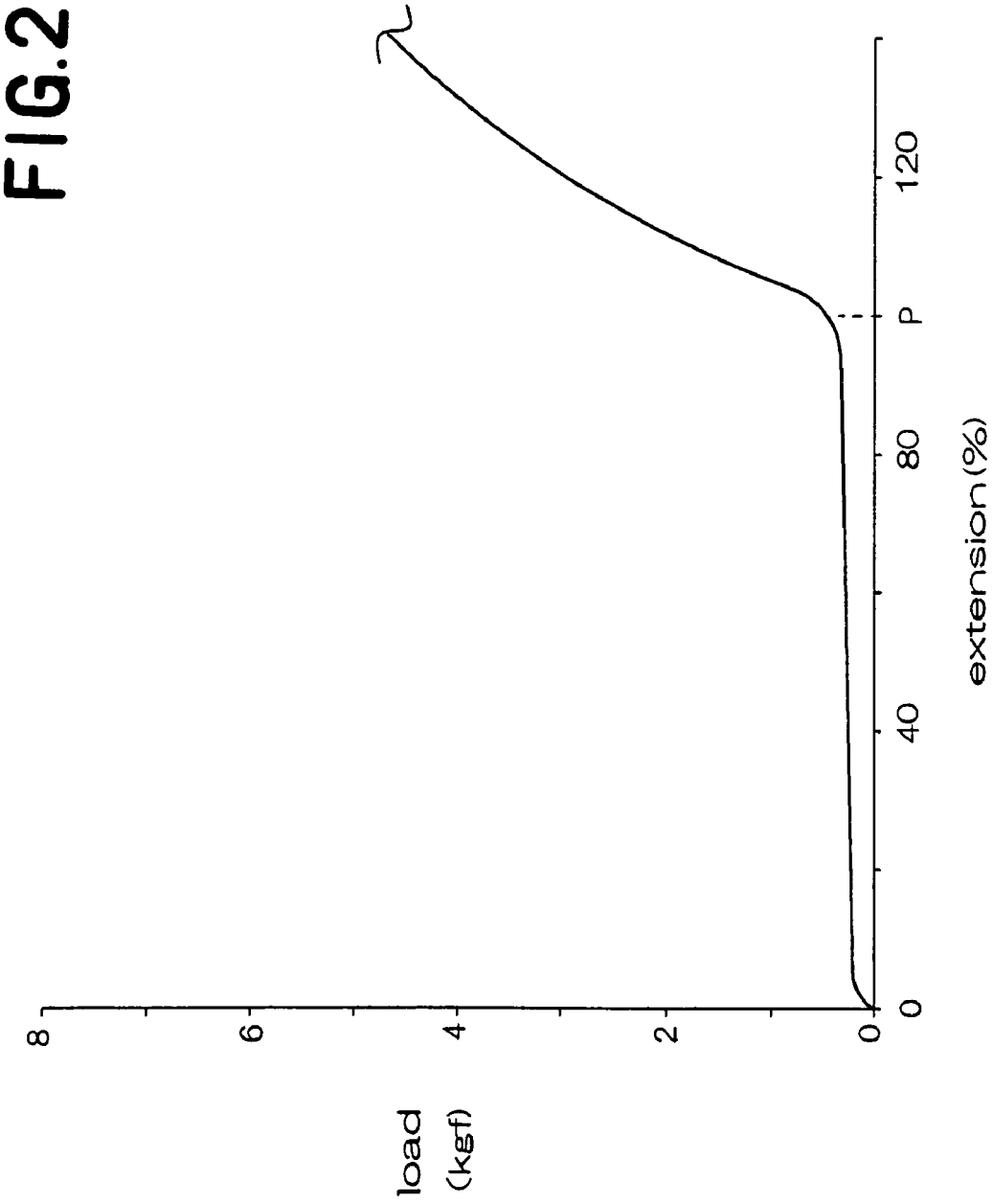

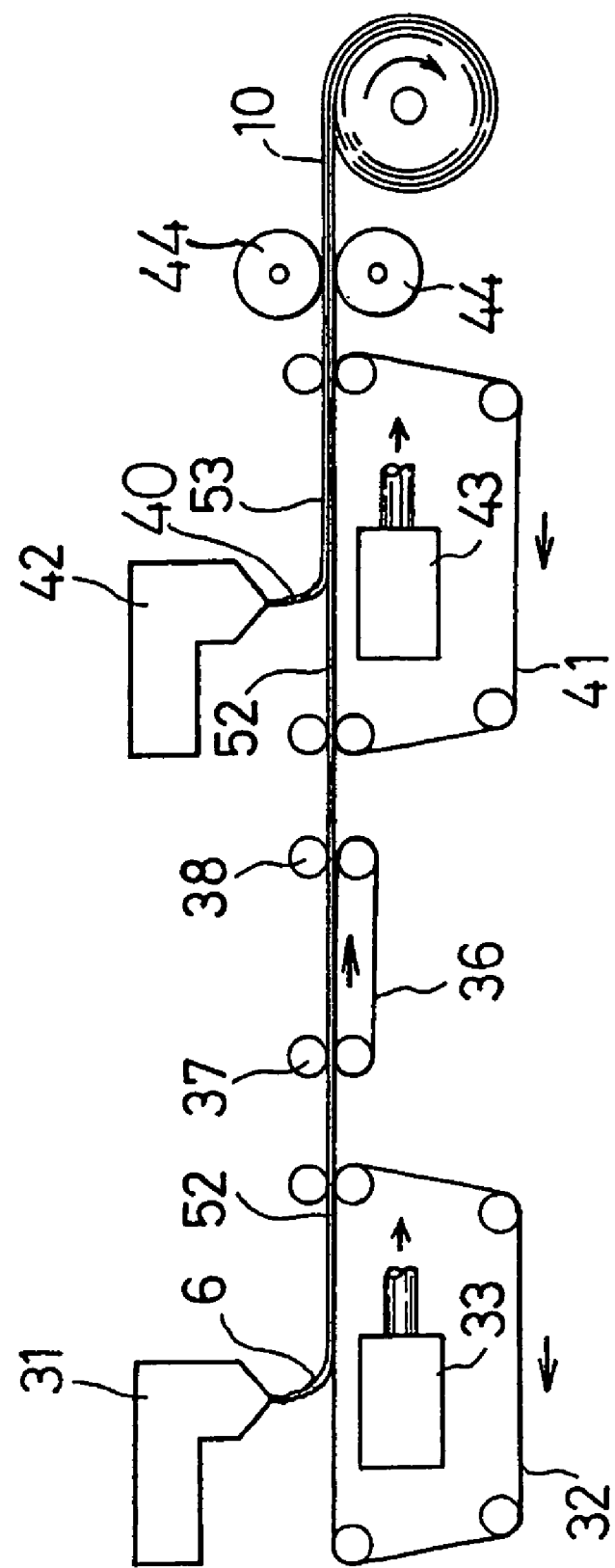

COMPOSITE SHEET AND PROCESS FOR MAKING THE SAME

RELATED APPLICATIONS

This application is a divisional application of U.S. patent application Ser. No. 09/821,230, filed Mar. 29, 2001 now U.S. Pat. No. 6,995,100 to which priority is claimed under 35 U.S.C. §120 and though which priority is claimed under 35 U.S.C. §119 to Japanese Patent Application No. 2000-099888, filed Mar. 31, 2000.

BACKGROUND OF THE INVENTION

This invention relates to a composite sheet comprising an elastically stretchable web and an inelastically stretchable web formed with inelastically stretchable continuous fibers and also to a process for making the composite sheet.

Japanese Patent Application Publication No. 1994-184897A describes elastically stretchable composite stock material obtained by a process comprising steps of stretching inelastic material to neck this material, bonding this material as it is necked to an elastically stretchable sheet which is under a tension at three or more non-linearly arranged regions and finally relieving the stretchable sheet of its tension. So far as the necked material is of fibrous nature, such process of prior art enables the necked material to form a plurality of gathers as the elastically stretchable sheet is relieved of its tension and thereby to convert a rubber-like touch peculiar to the surface of the elastically stretchable sheet to a comfortable cloth-like touch without deterioration of a desired stretchability of the elastically stretchable sheet.

According to this technique of prior art, the necked material is obtained by stretching, for example, a spun bond nonwoven fabric comprising thermoplastic synthetic fibers fused together in one direction. Of the fibers unevenly distributed in this nonwoven fabric, some are plastically deformed in the one direction and thereby actually stretched while the others are merely reoriented in the one direction as the nonwoven fabric is stretched in the one direction. The actual stretched fibers have their diameters reduced and the merely reoriented fibers maintain their initial diameters. Consequently, the elastically stretchable composite stock material obtained in this manner is disadvantageously accompanied with a remarkable unevenness of the fiber diameters. This may lead to the unevenness in touch as well as in appearance of the product.

SUMMARY OF THE INVENTION

It is an object of this invention to provide a composite sheet that comprises an elastically stretchable layer and an inelastically stretchable fibrous layer in which the unevenness of the fiber diameter in the inelastically stretchable fibrous layer is minimized and a process for making such sheet.

The object set forth above is achieved, according to one aspect of this invention, by a novel composite sheet and, according to another aspect of this invention, by a novel process for making this novel composite sheet.

This invention relates to, in one aspect thereof, the composite sheet comprising an elastically stretchable layer having upper and lower surfaces and an inelastically stretchable fibrous layer formed with inelastically stretchable continuous fibers, these two layers being bonded together intermittently in first and second directions orthogonal to each other, at least, in the first direction.

In such a composite sheet, the continuous fibers are oriented substantially in the one direction so that a tensile strength S.sub.1 of the composite sheet in the first direction and a tensile strength S.sub.2 of the composite sheet in the second direction may define a ratio $S_1/S_2$ of 3.0 or higher.

This invention relates to, in another aspect thereof, a process for making the composite sheet by bonding an elastically stretchable layer having upper and lower surfaces and an inelastically stretchable fibrous layer put on at least one of the upper and lower surfaces to each other intermittently in first and second directions orthogonal to each other, at least, in said first direction.

In such a process, the continuous fibers lie one upon another substantially without being bonded together to form the inelastically stretchable web and that the web is, in turn, bonded to the elastically stretchable web after the continuous fibers have been oriented substantially in the one direction.

According to one embodiment of the invention, the process comprises the steps of extruding the continuous fibers from a melt extruder, collecting the continuous fibers on a conveyor running in one direction to form the inelastically stretchable web, orienting the continuous fibers substantially in the one direction and at the same time placing the continuous fibers upon the elastically stretchable web and finally bonding these two webs together intermittently in the one direction to obtain the composite sheet.

According to another embodiment of the invention, the step of orienting said continuous fibers substantially in said one direction including the use of a first conveyor running at a velocity $V_1$ and a second conveyor provided downstream of the first conveyor and running at a velocity $V_2$ so that a ratio $V_2/V1$ may lie in a range of 1.05 ~10.

BRIEF DESCRIPTION OF THE DRAWINGS

FIG. 2 is a graphic diagram plotting a load/extension percentage curve; and

FIG. 3 is a diagram schematically illustrating the process for making a composite sheet according to one embodiment of the present invention.

DETAILED DESCRIPTION OF THE PREFERRED EMBODIMENTS

Figure 1:
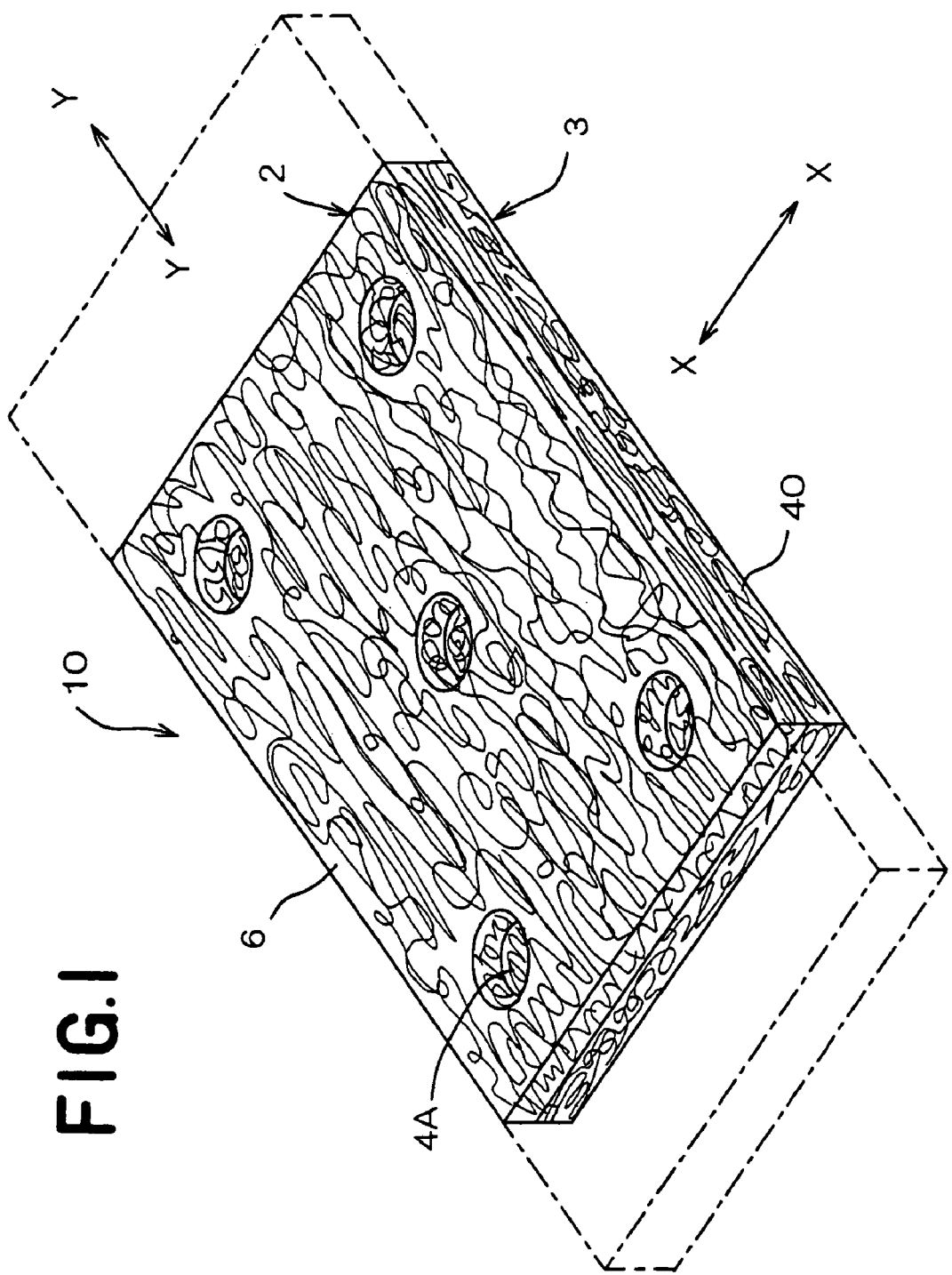
FIG. 1 is a perspective view of a composite sheet according to one embodiment of the present invention.

Details of the composite sheet and the process for making the same according to this invention will be more fully understood from the description given hereunder with reference to the accompanying drawings.

A composite sheet 10 depicted by FIG. 1 in a perspective view comprises an elastically stretchable layer 3 formed by continuous fibers 40 of styrene-based elastomer and an inelastically stretchable layer 2 formed with an inelastically stretchable polypropylene continuous fibers 6 fused with upper surface of the elastically stretchable layer 3 at bonding regions 4A. The composite sheet 10 has X-direction and Y-direction being orthogonal to the X-direction so that the layer 3 is elastically stretchable at least in Y-direction of the X- and Y-directions. The continuous fibers 6 of the inelastically stretchable layer 2 are oriented so as to extend substantially in Y-direction. In the case wherein the elastically stretchable layer 3 has a substantially same tensile strength in X- and Y-directions, a degree of orientation of the continuous fibers 6 can be expressed by a ratio $S_1/S_2$ where $S_1$ represents a tensile strength as measured in Y-direction and $S_2$ represents a tensile strength as measured in X-direction. For the composite sheet 10 according to this invention, the continuous fibers 6 are preferably oriented with a ratio $S_1/S_2$ of 3.0 or higher. Except at the bonding regions, the continuous fibers 6 are neither fused nor bonded together but substantially brought into close contact with one another. In other words, the aggregative strength among these fibers 6 are extremely feeble so that the continuous fibers 6 are easily separated from one another as the composite sheet 10 is slightly stretched in Y-direction.

Assumed that the composite sheet 10 is stretched in Y-direction with tensile force such that breaking extensions of the two layers 2, 3 are not exceeded and an elasticity limit of the elastically stretchable layer 3 is not exceeded, the layer 3 is elastically stretched while the layer 2 is inelastically stretched. As a result, the continuous fibers 6 of the layer 2 are plastically deformed so as to be thinned and lengthened. Relieved of the stretching force, the composite sheet 10 contracts substantially to its initial dimension under contractible force provided by the layer 3. Thereupon, the continuous fibers 6 having been inelastically stretched form a plurality of gathers and the layer 2 of these continuous fibers 6 become more bulky than before stretched. In this way, the layer 2 offers a comfortably soft touch.

FIG. 2 is a graphic diagram plotting a load/extension percentage curve observed as the composite sheet 10 is stretched anew after the sheet 10 has been once stretched until the extension percentage reaches 150%. Specific construction of the composite sheet 10 will be described below. The extension percentage of the composite sheet 10 for the first time of stretching is defined as the initial extension percentage $E_f$.

In the inelastically stretchable layer:
   inelastically stretchable continuous fibers:
   polypropylene/terpolymer of propylene, ethylene and butene=60/40 (weight ratio)
     fiber diameter: 15.2 μm
     basis weight: 15 g/m$^2$ In the elastically stretchable layer:
   elastically stretchable continuous fibers: styrene-based elastomer
     fiber diameter: 16.4 μm
     basis weight: 60 g/m$^2$ Tensile strength ratio ($S_1/S_2$) of the composite sheet: 4.9

As will be apparent from FIG. 2, the curve gently rises and then reaches a inflection point P corresponding to an extension percentage of 100% under a substantially uniform load. From this inflection point, the curve sharply rises.

What is claimed is:

1. A process for making a composite sheet which comprises:
   providing an elastically stretchable layer having upper and lower surfaces;
   providing an inelastically stretchable fibrous layer formed with inelastically stretchable continuous fibers that are laid down upon a support so that the continuous fibers lay upon one another without being bonded together thereby forming the inelastically stretchable fibrous layer;
   orienting said inelastically stretchable continuous fibers in a first direction;
   positioning said inelastically stretchable fibrous layer on at least one of the upper and lower surfaces of the elastically stretchable layer; and
   intermittently bonding said elastically stretchable layer and said inelastically stretchable fibrous layer to each other in said first direction and a second direction orthogonal to said first direction,
   wherein the step of orienting said inelastically stretchable continuous fibers substantially in said first direction causes a tensile strength $S_1$ of said composite sheet in said first direction and a tensile strength $S_2$ of said composite sheet in said second direction to have a ratio of $S_1/S_2$ of 3.0 or higher.

2. The process according to claim 1, wherein said step of orienting said inelastically stretchable continuous fibers substantially in said first direction comprises conveying said inelastically stretchable continuous fibers on a first conveyor running at a velocity $V_1$ and a second conveyor provided downstream of said first conveyer, said second conveyer running at a velocity $V_2$ so that a ratio $V_2/V_1$ is within a range of 1.05 to 10.

3. A process for making a composite sheet comprising steps of:
   extruding inelastically stretchable continuous fibers from a melt extruder:
   collecting said inelastically stretchable continuous fibers on a conveyor running in one direction to form an inelastically stretchable web;
   orienting said inelastically stretchable continuous fibers substantially in said one direction;
   providing an elastically stretchable web;
   placing said inelastically stretchable continuous fibers upon said elastically stretchable web; and
   bonding said inelastically stretchable web and said elastically stretchable web together intermittenlly in said one direction and a second direction orthogonal to said first direction to obtain said composite sheet,
   wherein the step of orienting said inelastically stretchable continuous fibers substantially in said one direction causes a tensile strength $S_1$ of said composite sheet in said first direction and a tensile strength $S_2$ of said composite sheet in said second direction to have a ratio of $S_1/S_2$ of 3.0 or higher.

4. The process according to claim 3, wherein said step of orienting said inelastically stretchable fibers substantially in said first direction comprises conveying said inelastically stretchable fibers on a first conveyer running at a velocity $V_1$ and on a second conveyor provided downstream of said first conveyor, said second conveyer running at a velocity $V_2$ so that a ratio $V_2/V_1$ is within a range of about 1.05 to 10.

* * * * *

UNITED STATES PATENT AND TRADEMARK OFFICE
CERTIFICATE OF CORRECTION

PATENT NO. : 7,563,337 B2
APPLICATION NO. : 11/217754
DATED : July 21, 2009
INVENTOR(S) : Satoru Tange and Hiroyuki Ohata It is certified that error appears in the above-identified patent and that said Letters Patent is hereby corrected as shown below:

In the Specification

In column 2, line 1, delete "S.sub.1" and replace with "$S_1$".

In column 2, line 2, delete "S.sub.2" and replace with "$S_2$".

Signed and Sealed this

Twenty-third Day of March, 2010

David J. Kappos
*Director of the United States Patent and Trademark Office*